United States Patent [19]

Suzuki et al.

[11] 4,314,151

[45] Feb. 2, 1982

[54] FOCUS DETECTION BY ACCUMULATION OF A GIVEN NUMBER OF THE LARGEST ABSOLUTE DIFFERENCE MAGNITUDES BETWEEN ADJACENT PHOTOCELLS IN AN ARRAY

[75] Inventors: Takeomi Suzuki, Tokyo; Masahiro Aoki, Fussa, both of Japan

[73] Assignee: Olympus Optical Company Ltd., Japan

[21] Appl. No.: 87,489

[22] Filed: Oct. 23, 1979

[30] Foreign Application Priority Data

Oct. 24, 1978 [JP] Japan ................................ 53-130620

[51] Int. Cl.³ .................................................. G03B 3/10
[52] U.S. Cl. .................................... 250/204; 354/25
[58] Field of Search ............. 250/204, 201, 209, 578; 354/25, 31; 356/4

[56] References Cited

U.S. PATENT DOCUMENTS

4,083,056  4/1978  Nakamura et al. ............. 250/201 X
4,133,606  1/1979  Hosoe et al. .......................... 354/25
4,180,309  12/1979  Miyata et al. ......................... 354/25
4,265,520  5/1981  Tokutomi et al. ............. 250/204 X

*Primary Examiner*—David C. Nelms
*Assistant Examiner*—Edward P. Westin
*Attorney, Agent, or Firm*—Weinstein & Sutton

[57] ABSTRACT

A focus detection system is provided in which an image of an object is projected onto an array comprising a plurality of light acceptor elements, formed by photoelectric elements, to cause them to produce photoelectric signals in accordance with the distribution of light intensity of the image. The photoelectric signals are converted into digital equivalents, and an absolute magnitude of a difference between digital signals of adjacent elements is calculated. These absolute magnitudes are arranged in the sequence of their magnitude, and a given number of them is accumulated, starting from the largest one. The accumulated value is utilized as the value of an evaluation function which indicates the sharpness of the image.

12 Claims, 15 Drawing Figures

FOCUS DETECTION BY ACCUMULATION OF A GIVEN NUMBER OF THE LARGEST ABSOLUTE DIFFERENCE MAGNITUDES BETWEEN ADJACENT PHOTOCELLS IN AN ARRAY

BACKGROUND OF THE INVENTION

The invention relates to a focus detection system, and more particularly, to such system in which an in-focus position of an optical instrument such as a camera, microscope or the like is detected by an electrical processing of a picture signal from an object being observed.

A conventional technique for detecting an in-focus position of an optical instrument such as photographic camera, microscope or the like utilizes a light acceptor assembly having a plurality of discrete light acceptor regions on which an optical image of an object being observed is projected to derive picture information from the respective regions, which information is then used as a basis to calculate the magnitude of a given evaluation function, which is in turn effective to determine whether or not the image of the object is focussed on the regions.

The evaluation function serves as a means for evaluating the sharpness of an image, and a variety of such functions are proposed. Typical functions include $$S = \sum_{k=1}^{K-1} | x_k - x_{k+1} | \tag{1}$$

$$S = \sum_{k=1}^{K} \frac{| x_k - \bar{x} |}{K} \tag{2}$$

$$S = \frac{\sqrt{\left(\sum_{k=1}^{K} x_k \cos \frac{2\pi k \nu}{K}\right)^2 + \left(\sum_{k=1}^{K} x_k \sin \frac{2\pi k \nu}{K}\right)^2}}{\sum_{k=1}^{K} x_k} \tag{3}$$

where K represents the number of light acceptor elements, $x_k$ represents a photoelectric output from K-th element, $\bar{x}$ an average value of photoelectric outputs from the light acceptor elements, $\nu$ the spatial frequency of an image flux.

The evaluation function S of the expression (1) signifies that the sharpness of an image is evaluated in accordance with the total sum of absolute values of the differences between outputs from adjacent picture elements while the evaluation function S of the expression (2) signifies that the sharpness of an image is evaluated in accordance with an average of absolute values of differences between individual outputs from the respective picture elements and an average value. Finally, the evaluation function S of the expression (3) utilizes a power spectrum of spatial frequences of an image flux which is chosen as the basis to evaluate the sharpness of an image.

Figure 1:
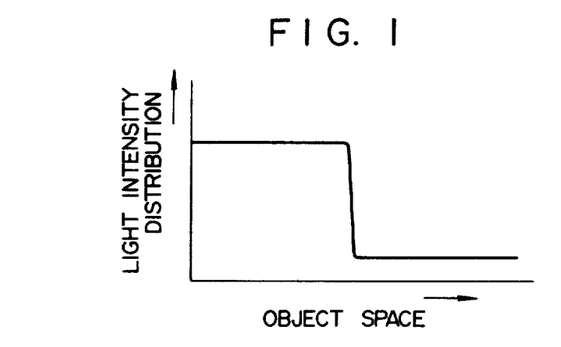
FIG. 1 graphically shows the distribution of light intensity in an object space.

The light intensity distribution of an image produced in an optical instrument such as a photographic camera, microscope or the like exhibits a variety of forms. A focussing operation takes place by utilizing a limited region such as the boundary between an image of an object and its background where the distribution of the light intensity is frequently represented by a stepped distribution, as illustrated in FIG. 1. The focussing by sight also is based on the distribution of the light intensity in such region. Consequently, a function which effectively evaluates such stepped distribution of the light intensity is most desirable for practical purposes.

Figure 2:
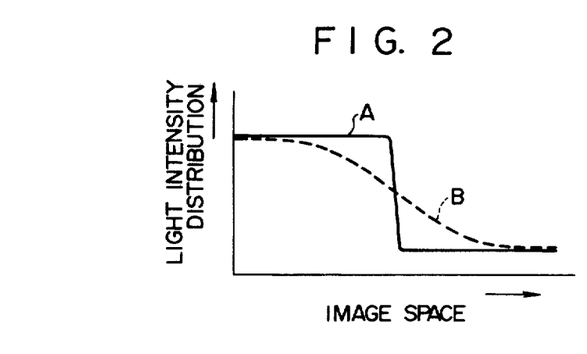
FIG. 2 graphically shows the distribution of light intensity in an image space.

FIG. 2 graphically shows the distribution of the light intensity of an image when in focus where an image plane is located within the depth of focus of a focussing lens for an object exhibiting the stepped distribution as shown in FIG. 1 as well as such distribution when defocussed where the image plane is located out of the depth of focus. The curve A shown in solid line represents such distribution when in focus while the dotted line curve B represents the distribution when defocussed.

Figure 3:
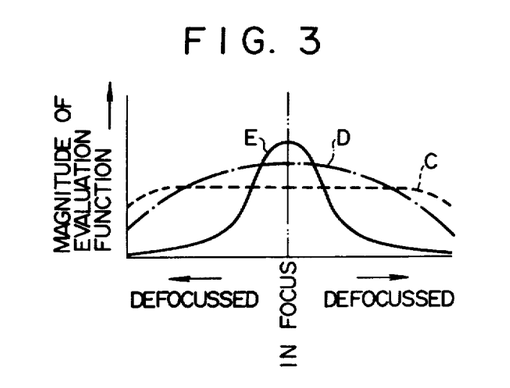
FIG. 3 graphically shows curves of evaluation functions which are used in conventional focus detection systems.

If the function of the expression (1) is used as an evaluation function for an image exhibiting such stepped distribution, the resulting curve which plots the magnitude of the evaluation function over varying positions will be represented by curve C shown in dotted lines in FIG. 3. The curve C is approximately rectilinear over a wide range including the in-focus position, so that no significant difference is recognized between an in-focus condition and a defocussed condition. Hence, it is apparent that such function is not suitable to evaluate the image which exhibits a stepped distribution of light intensity. When the evaluation function of the expression (2) is employed, the resulting curve will be gently curved as indicated by phantom line D in FIG. 3. Though a difference is recognized between an in-focus condition and a defocussed condition, the magnitude of the difference is insignificant. In particular, in a region adjacent to the in-focus position, the curve D approaches a rectilinear trace, so that an accurate focussing operation is difficult to achieve. The use of the evaluation function of the expression (3) provides a solid line curve E shown in FIG. 3 which exhibits a steeply rising peak toward the in-focus position, enabling a clear distinction between the in-focus and defocussed conditions. However, the involved calculation is very complex, which is a great disadvantage.

SUMMARY OF THE INVENTION

It is an object of the invention to eliminate the described disadvantages of conventional focussing detection systems which utilize the various evaluation functions mentioned above, by providing a focus detection system in which an image of an object being observed is projected onto an array of light acceptor elements and in which the absolute magnitude of a difference between photoelectric signals of adjacent elements is calculated and these absolute magnitudes are arranged in the sequence of the magnitude to produce an accumulated value which covers a given number of these absolute magnitudes which are greatest in their magnitude, for use as an evaluation function which determines the sharpness of the image projected onto the array.

It is another object of the invention to provide a focus detection system including a pair of arrays of light acceptor elements which are disposed forwardly and rearwardly of a plane which is conjugate with a focus plane of a focussing lens and on which the same image of an object is projected to derive the magnitude of an evaluation function associated with each array in the same manner as mentioned in the preceding paragraph and wherein the magnitudes of the separate evaluation functions are compared against each other to provide a determination of an in-focus condition.

It is a further object of the invention to provide a focus detection system including a pair of arrays of light acceptor elements disposed forwardly and rearwardly of a plane which is conjugate with a focus plane of a focussing lens and on which the same image of an object is projected and wherein each of the arrays is divided into a plurality of sets each including two or more light acceptor elements, each set being regarded as a single effective element to derive the absolute magnitude of a difference between signals of adjacent sets, thus providing a series of such absolute magnitudes, a given number of which are accumulated which are greatest in their magnitude to derive an accumulated value representing an evaluation function which defines the sharpness of an image of the object, the values of these evaluation functions being compared against each other to provide a determination of an in-focus condition.

It is still another object of the invention to provide a focus detection system including a pair of arrays of light acceptor elements disposed forwardly and rearwardly of a plane which is conjugate with a focus plane of a focussing lens and on which the same image of an object is projected and wherein the absolute magnitude of a difference between photoelectric signals from adjacent light acceptor elements is calculated to produce a series of such absolute magnitudes in each array, a given number of which are accumulated which are greatest in their magnitude to provide an accumulated value which defines an evaluation function for fine adjustment and wherein each array is divided into a plurality of sets each including two or more light acceptor elements and each representing a single effective element, and the absolute magnitude of a difference between signals from adjacent sets is calculated to produce a series of such absolute magnitudes, a given number of which are accumulated which are greatest in their magnitude to provide an accumulated value which defines an evaluation function for coarse adjustment, the evaluation functions for coarse adjustment being used whenever the value of the evaluation functions for fine adjustment is below a given threshold level while the evaluation functions for fine adjustments are used whenever the threshold level is exceeded to provide a determination of an in-focus condition.

With the present invention, the sharpness of an image of an object is evaluated by utilizing only that region of the image where most rapid change occurs in the distribution of the light intensity of the image. This assures a detection of a focussed condition which is as accurate as a focussing operation by sight even though the distribution of the light intensity may vary in various manners and over an extensive range.

Since the sharpness of an image is evaluated by utilizing only that region where the light intensity distribution in the image space varies rapidly, rather than evaluating the entire region of the object image, the calculation process required to derive the values of the evaluation functions is greatly simplified, enabling an efficient detection and allowing the arrangement of a detection unit to be simplified.

By dividing an array of light acceptor elements into a plurality of sets each including more than one element and each of which is regarded as a single effective element, the accuracy with which the sharpness of an image is evaluated can be changed in accordance with the number of elements contained in one set.

Whenever the value of the evaluation functions which are derived from signals of individual light acceptor elements in the arrays is below a given threshold level, the evaluation functions which are derived from signals of sets of light acceptor elements are utilized to evaluate the sharpness of an image. In this manner, a fine adjustment and a coarse adjustment of the focussing operation is achieved above and below the threshold level, thus enabling a smooth focussing operation with a high accuracy.

DESCRIPTION OF PREFERRED EMBODIMENTS

Figure 4:
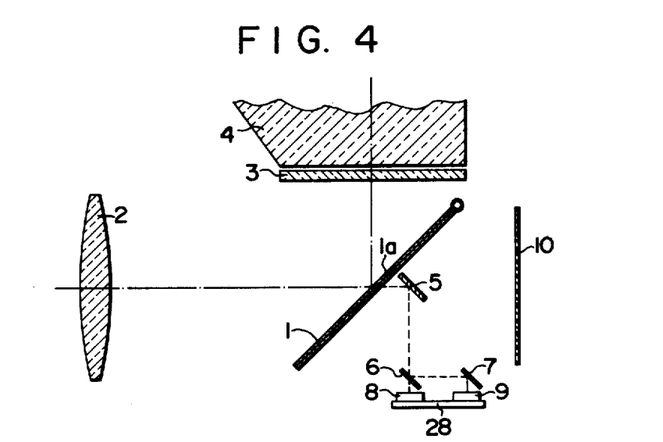
FIG. 4 is a schematic view, partly in section, of a single lens reflex camera in which a light acceptor assembly of a focus detection system according to the invention is incorporated.

Referring to FIG. 4, there is shown an embodiment of the focus detection system according to the invention which is disposed within a single lens reflex camera.

As is well recognized, a single lens reflex camera includes a movable reflecting mirror 1 which is normally disposed at an angle of 45° with respect to a taking light path, but which is driven out of the path when taking a picture. The camera includes taking lens 2, and light from an object being photographed which transmits through lens 2 into the camera is reflected by mirror 1, and passes through focussing glass 3 and pentaprism 4 or the like to present an image within an eyepiece window (not shown) of a viewfinder. In the camera shown, mirror 1 is centrally formed with half-mirror 1a, and light transmitting through the half-mirror 1a impinges on total reflection mirror 5, which is disposed adjacent to, but rearwardly thereof, to be directed downward. The light reflected by total reflection mirror 5 is split into two portions by half-mirror 6. One portion of the light transmits through half-mirror 6 to be incident on a first array of light acceptor elements 8 while the remaining portion is reflected by half-mirror 6 and another total reflection mirror 7 to be incident on a second array of light acceptor elements 9. In this manner, the arrays 8, 9 are located at different optical distances from taking lens 2 which represents a focussing lens. Their location is chosen such that the first array 8 is disposed forwardly of and the second array 9 is disposed rearwardly of a plane (not shown) which is conjugate with the surface of photographic film 10. Specifically, the first array 8 is located forwardly and the second array 9 is disposed rearwardly of the in-focus position which is conjugate with the film surface. It will be noted that the arrays 8, 9 are placed on and secured to common baseplate 28.

Figure 5:
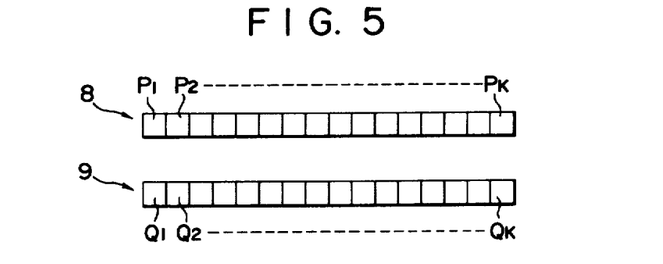
FIG. 5 is a plan view of arrays of light acceptor elements which are used in the assembly shown in FIG. 4.
Figure 6:
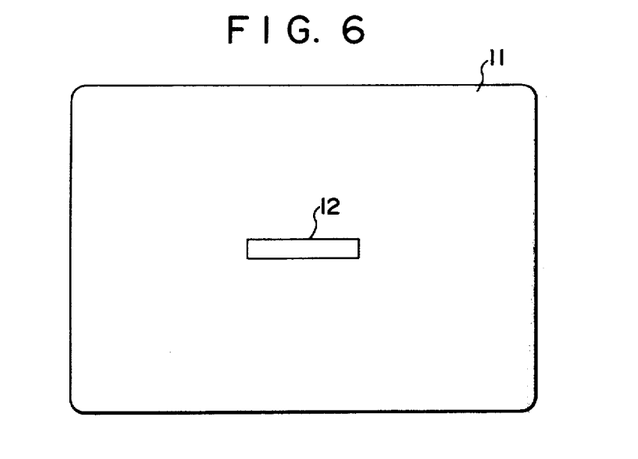
FIG. 6 is a front view of a picture frame indicating a focussing region in which the arrays of FIG. 5 are disposed.

Referring to FIG. 5, the arrays 8, 9 each comprise the same number (K=16 in the example shown) of light acceptor elements $P_1-P_K$, $Q_1-Q_K$ which are disposed in alignment with each other and each of which is formed by a photoelectric transducer element of a same configuration and size. It is to be noted that the arrays 8, 9 are congruent to each other. As shown in FIG. 6, these arrays 8, 9 are disposed in optical alignment with strip-shaped focus region 12 which extends centrally across picture frame 11 so that an image of an identical portion of an object being photographed is projected on light acceptor elements of the arrays 8, 9 which correspond to each other. In this manner, the detection on an in-focus condition takes place as referenced to an object being photographed which is imaged onto the focus region 12. It is to be understood that the configuration of the arrays 8, 9 is not limited to the strip form shown, but may be cruciform, with the configuration of the focus region 12 being changed accordingly in an analogous manner.

Figures 7, 8, 9:
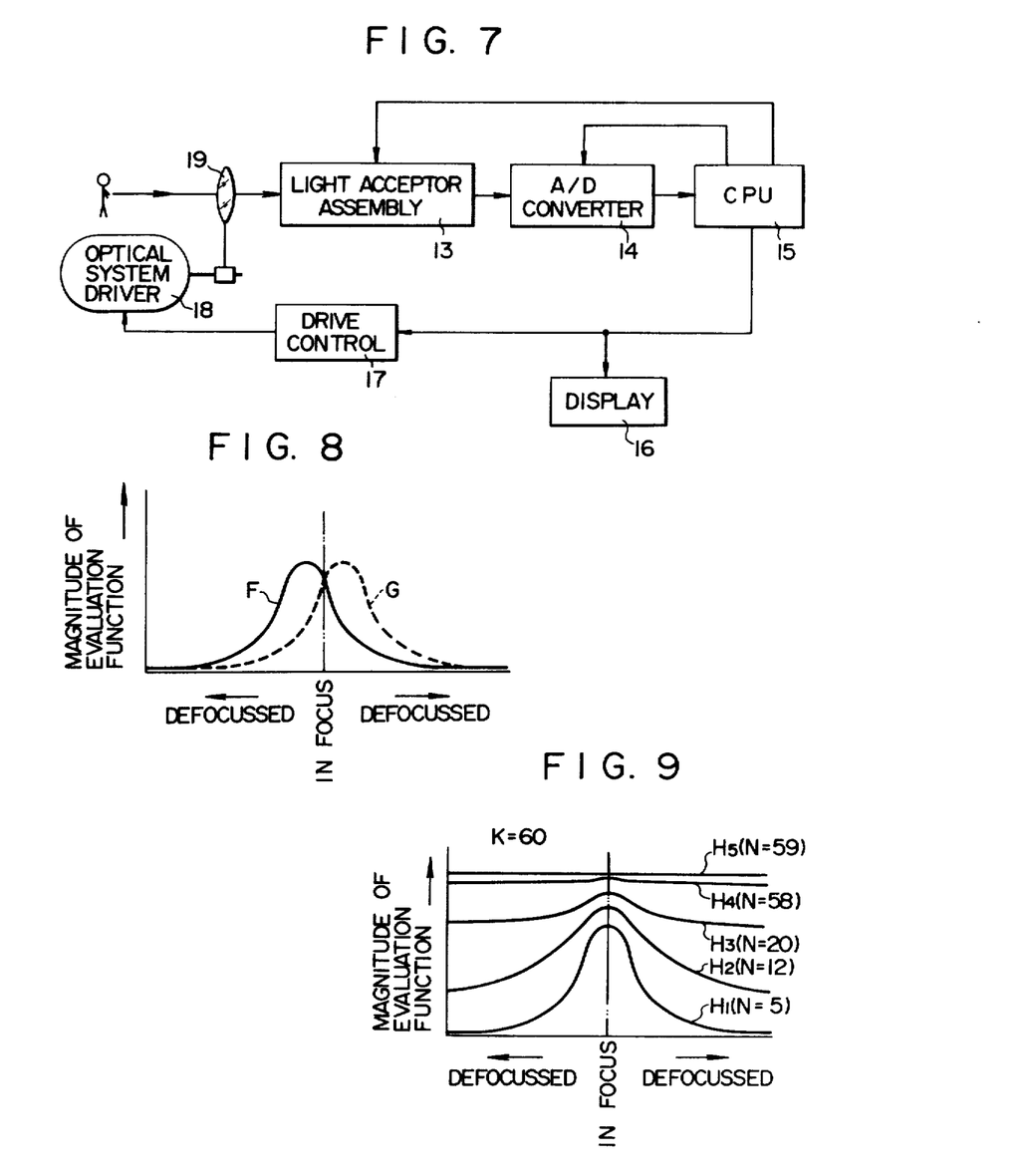
FIG. 7 is a block diagram of an electrical circuit which is used in the focus detection system of the invention.
FIG. 8 graphically shows curves representing evaluation functions derived from a pair of arrays of light acceptor elements shown in FIG. 5.
FIG. 9 graphically shows a series of evaluation function curves which change depending on the values of a parameter.

FIG. 7 shows a focus detection system according to the invention including light acceptor assembly 13 in which both arrays 8, 9 are disposed. In addition to the light acceptor assembly 13, the focus detection system comprises A/D converter 14 which converts analog luminance information produced by light acceptor assembly 13 into corresponding digital information, and central processor unit 15 which calculates the magnitude of an evaluation function to determine an in-focus condition in accordance with the invention. The central processor unit 15 provides an output in the form of a focus detection signal which is supplied to display 16 and optical system drive control circuit 17. The display 16 indicates an in-focus condition in accordance with the focus detection signal. The circuit 17 responds to the focus detection signal by feeding a drive output to optical system driver 18 which comprises a servo motor or the like. In response thereto, the driver 18 moves taking optical system 19, which may comprise the taking lens 2, along its optical axis and in a direction for automatically adjusting the focus. In a simplified camera construction, optical system 19 may be manually driven in accordance with an indication provided by display 16. In this instance, drive control circuit 17 and driver 18 may be omitted. It is to be understood that the central processor unit 15 is also connected with light acceptor assembly 13 and converter 14 to supply control signals thereto.

In operation, light from an object being photographed passes through focussing lens 2 to enter the camera (see FIG. 4) with a portion thereof transmitting through half-mirror portion 1a of movable reflecting mirror 1 to be projected onto the arrays 8, 9. In response to such projection, individual light acceptor elements $P_1-P_K$ and $Q_1-Q_K$ of the arrays 8, 9 produce photoelectric signals in accordance with the amount of light received by the respective elements, and these photoelectric signals are converted into corresponding digital signals for input to the central processor unit 15 where the value of an evaluation function is calculated in accordance with the invention.

It is generally recognized that a maximum contrast is achieved when the taking lens 2 (FIG. 4) is in its in-focus position. Consequently, by calculating the magnitude of the contrast based on the distribution of light intensity on the first and second arrays 8, 9, the contrast derived from the array of elements which is located closer to the focus plane of taking lens 2 will exhibit a greater value than the contrast of the other array, and the values of the contrast derived from both arrays 8, 9 will be equal to each other when the focus plane is located substantially centrally between the arrays 8, 9. Hence, by choosing a medium position between the arrays 8, 9 as a focus plane which is conjugate with the film surface 10, the comparison of the values of the contrast derived from the arrays 8, 9 provides an indication whether the imaging plane of taking lens 2 coincides with the in-focus plane or whether it is not in focus.

In the focus detection system of the invention, the value of the contrast is evaluated by calculating the absolute magnitude of the difference between photoelectric signals of adjacent light acceptor elements $P_1-P_K$, $Q_1-Q_K$ in each array 8, 9. These absolute magnitudes are rearranged into a series $D_1, D_2 \ldots D_{k-1}$ in the sequence of their magnitude. An evaluation function S is defined as follows:

$$S = \sum_{n=1}^{N} D_n$$

where N is a positive integer which is less than a given number $K-1$.

The evaluation function S will be at its maximum when the taking lens 2 (FIG. 4) is in its in-focus position. Thus, evaluation functions $S_1$, $S_2$ are derived based on the photoelectric signals from the first and second arrays 8, 9, and by comparing the values of these evaluation functions $S_1$, $S_2$, an in-focus position of taking lens 2 can be detected. Specifically, referring to FIG. 8, the evaluation function $S_1$ derived from the first array 8 which is disposed forwardly of an in-focus plane will be represented by a solid line peaked curve F while the evaluation function $S_2$ derived from the second array 9 which is disposed rearwardly of the in-focus plane will be represented by a dotted line curve G which is similar in configuration to the curve F. The curves F, G are equally spaced from the in-focus plane shown by a vertical phantom line which is conjugate with the film surface. Since the arrays 8, 9 are located so that the point where the curves F, G coincide with each other represents the in-focus position, it follows that the image of an object being photographed is focussed onto the film surface by taking lens 2 when the values of the evaluation functions $S_1$, $S_2$ are equal to each other. If the relationship between the values of the evaluation functions $S_1$, $S_2$ is such that $S_1 > S_2$, the in-focus plane is located nearer to the first array 8 than it is the second array 9. Conversely, if $S_1 < S_2$, the in-focus plane will be located nearer to the second array 2 than it is to the first array 8.

Consequently, by calculating the values of $S_1$ and $S_2$ and comparing their relative magnitude by the central processor unit 15 which then provides a comparison result to be displayed by display 16, a user is capable of moving taking lens 2 in accordance with the indication provided by the display 16 to bring the imaging plane of taking lens 2 into coincidence with the film surface 10 (FIG. 4). The polarity of the difference $S_1 - S_2$ indicates the direction in which taking lens 2 is to be moved to reach the in-focus position, so that this difference $S_1 - S_2$ can be fed as a control signal to drive control circuit 17, which then operates driver 18 in accordance with the polarity and the magnitude of the difference $S_1 - S_2$ to bring taking lens 2 into its in-focus position automatically.

FIG. 9 shows changes in the value of the evaluation function S as a function of the number N of absolute magnitudes which are accumulated when a stepped distribution of light intensity is projected onto the array of light acceptor elements. Assuming that the array comprises $K = 60$ light acceptor elements and N is chosen equal to 59, the resulting evaluation function will be represented by a linear curve indicated by reference character $H_5$. In this instance, it is impossible to determine whether the optical system is in focus or is defocussed. When the value of N is gradually reduced to 58, 20 and 12, the form of the resulting evaluation function gradually approaches a peaked form, and when the value of N is on the order of 5, there can be obtained a peaked curve $H_1$ which is particularly favorable to indicate the in-focus position. By experiments, the inventors have found that a satisfactory detection of the in-focus position is attained when the value of N is equal to or less than 20% of the number of light acceptor elements K.

Figure 10:
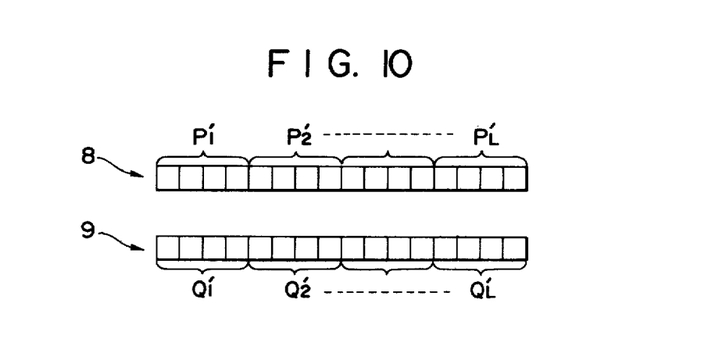
FIG. 10 is a plan view showing another example of division of the arrays of light acceptor elements.
Figure 11:
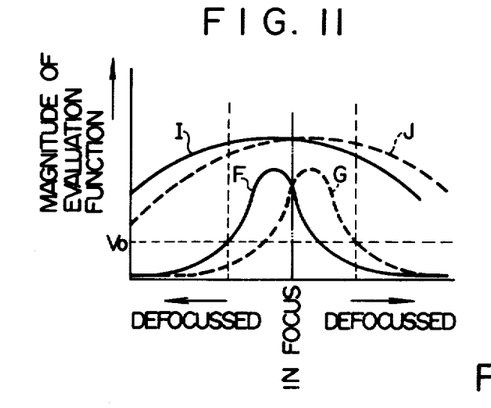
FIG. 11 graphically shows several evaluation function curves which are selectively used in accordance with a threshold level.

In the system of the invention, the values of the evaluation functions $S_1$, $S_2$ are derived from the absolute magnitudes of differences between photoelectric signals from adjacent light acceptor elements in the arrays 8, 9. However, as an alternative arrangement, more than one adjacent or consecutive light acceptor elements, which are four in the example shown, may be grouped together to define a set as shown in FIG. 10. In this manner, the arrays 8, 9 may be divided into a plurality of sets $P_1'-P_L'$ and $Q_1'-Q_L'$ where $L = K/4$. The sum of photoelectric signals of elements contained in one set may be regarded as a photoelectric output signal from a single effective element which is in fact one of the sets $P_1'-P_L'$, $Q_1'-Q_L'$. The photoelectric signals obtained in this manner may be utilized to derive the values of the evaluation functions $S_1'$ and $S_2'$. The effective result would be that of employing light acceptor elements of an increased size, and the photoelectric signals will be less influenced by a defocussing effect which is brought about by a small movement of taking lens 2, thus effectively reducing the accuracy of the evaluation of the image. Consequently, these evaluation functions $S_1'$, $S_2'$ may be employed for coarse adjustment. FIG. 11 shows solid line curve I and dotted line curve J which are equally spaced on the opposite sides of an in-focus position indicated by a phantom line and which are gently peaked. When the values of the evaluation functions $S_1$, $S_2$ which are derived on the basis of photoelectric signals from the individual elements $P_1-P_K$, $Q_1-Q_K$ is below a given threshold level $V_O$, the evaluation functions $S_1'$ and $S_2'$ may be used to provide a coarse adjustment of taking lens 2 until the value of the evaluation functions $S_1$ or $S_2$ exceeds the threshold level $V_O$, whereupon the latter evaluation functions are used to provide a fine adjustment of taking lens 2 in order to achieve an in-focus condition. It is to be noted that the choice between the fine adjustment evaluation functions $S_1$, $S_2$ and the coarse adjustment evaluation function $S_1'$, $S_2'$ may be based on a comparison against the threshold level $V_O$ of a sum $S_1 + S_2$ or a product $S_1 \cdot S_2$, in addition to the functions $S_1$ and $S_2$.

Figure 12:
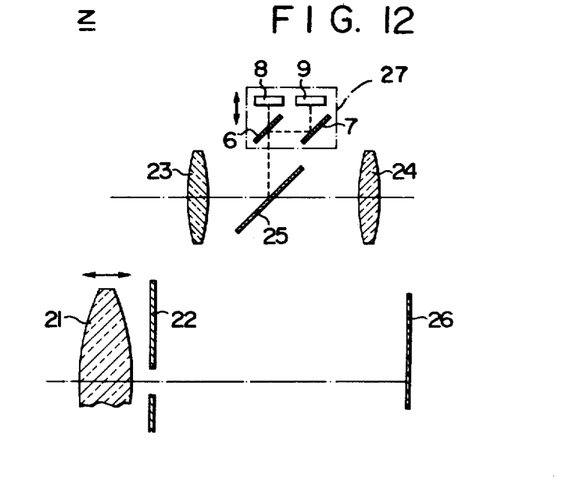
FIG. 12 is a schematic view, partly in section, of a camera having a between-lens shutter in which the light acceptor assembly of the focus detection system according to the invention is incorporated.

FIG. 12 shows another example of a photographic camera having a between-lens shutter in which the focus detection system of the invention is incorporated. As is well recognized, a photographic camera having a between-lens shutter has between-lens shutter 22 associated with taking lens 21 so that an image of an object being photographed cannot be viewed through taking lens 21. For this reason, a view-finder optical system is provided separately from the taking optical system to permit an image of the object to be viewed. The finder optical system comprises objective lens 23 which essentially comprises an imaging lens and eyepiece lens 24, and the light acceptor assembly of the focus detection system according to the invention is disposed therein. The light acceptor assembly comprises half-mirror 25 which is disposed at an angle in the light path of the finder, and half-mirror 6, total reflection mirror 7 and first and second arrays 8, 9 of light acceptor elements, all of which are similar to the embodiment shown in FIG. 4. It is to be understood that the arrays 8, 9 and mirrors 6, 7 are ganged with taking lens 21 for movement, so that when taking lens 21 is moved along the optical axis thereof for purpose of focussing operation, the arrays 8, 9 and mirrors 6, 7 which are shown in a block 27 indicated by phantom line also moves along the optical path of the finder which is modified by half-mirror 25. The relationship of ganged movement between taking lens 21 on one hand and arrays 8, 9 and mirrors 6, 7 on the other hand is chosen such that in an in-focus position of taking lens 21 where the image of an object being photographed is formed on the surface of film 26, the image of the object is focussed by objective lens 23 in the finder system at a position which is intermediate the arrays 8, 9. It will be appreciated that the light acceptor assembly thus constructed is connected with the picture signal processing circuit shown in FIG. 7. Obviously, the same functioning and effect as that of the single lens reflex camera shown in FIG. 4 are achieved when the focus detection system of the invention is employed in a photographic camera having a between-lens shutter.

Figure 13:
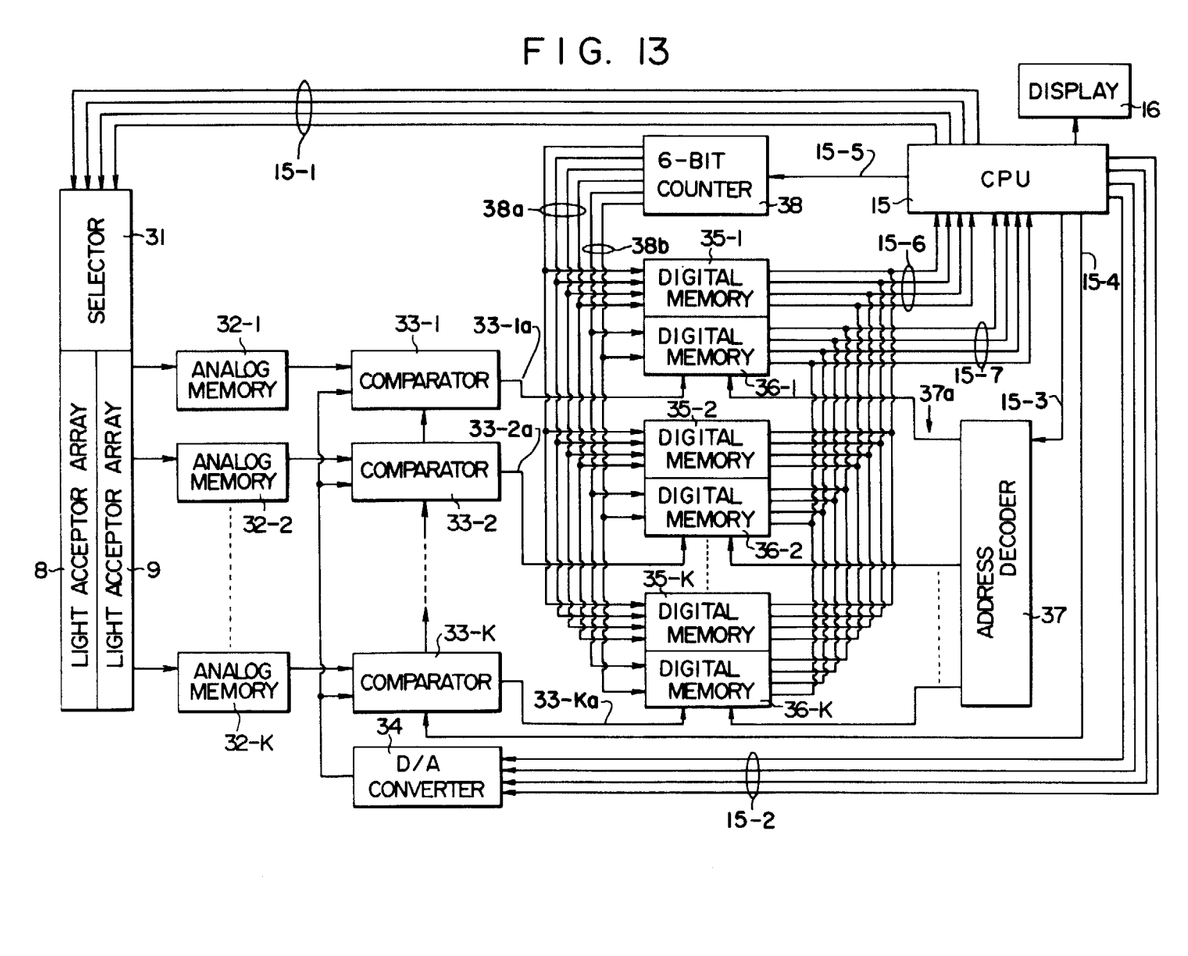
FIG. 13 is a circuit diagram showing the detail of a signal processor used in the system of FIG. 7.

FIG. 13 is a circuit diagram which illustrates the detail of signal processing circuit 14 shown in FIG. 7. The circuit includes central processing unit 15 which comprises a 4-bit microprocessor, for example, model 4040 microprocessor available from Intel Inc., providing a communication of information on the basis of a 4-bit word.

The first array 8 and the second array 9 are connected with selection circuit 31 which receives control signals from central processor unit 15 through the group of lines 15-1, and either array 8 or 9 can be selectively activated in accordance with an instruction from the latter. Individual light acceptor elements $P_1-P_K$ and $Q_1$-$Q_K$ of the arrays are individually connected with analog memories 32-1 to 32-K, each of which comprises a sample-and-hold circuit (not shown for purposes of simplicity), and which are in turn connected with one input of comparators 33-1 to 33-K, the other input of which is connected with D/A converter 34 which converts reference information from the group of lines 15-2 coupled to central processor unit 15, to be used for comparison purpose, into analog signal form. Illuminance information which is maintained in analog memories 32-1 to 32-K in accordance with the amount of light received by the individual elements $P_1$-$P_K$ or $Q_1$-$Q_K$ are compared against the reference information which is supplied in the form of an analog quantity by D/A converter circuit 34 in each comparator 33-1 to 33-K. The output of each comparator 33-1 to 33-K is through lines 33-1a to 33-ka connected with one control input of a corresponding one of memory circuits 36-1 to 36-K, each of which is associated with one of the 4-bit digital memories 35-1 to 35-K to define a set. The other control input of memory circuits 36-1 to 36-K is connected with the lines 37a of address decoder 37 which is in turn connected with central processor unit 15 through line 15-3. A 6-bit counter 38 receives and counts a count signal from line 15-5 of central processor unit 15, and the most significant four bits of the count in the counter 38 are supplied through the group of lines 38a to each of the digital memories 35-1 to 35-K while the least significant two bits of counter 38 are supplied through the group of lines 38b to the other digital memory 36-1 to 36-K associated with each digital memory 35-1 to 35-K. The outputs of the digital memories 35-1 to 35-K and 36-1 to 36-K are presented to central processor unit 15 through the groups of lines 15-6 and 15-7, in the form of 4-bit words. It is to be noted that a line 15-4 is shown connected from central processor unit 15 to each of comparators 33-1 to 33-K for controlling the comparators.

In operation, central processor unit 15 provides an instruction which causes selector circuit 31 to select the first array 8, thus enabling the light acceptor elements contained therein. The elements $P_1$-$P_K$ produce photoelectric signals in accordance with the distribution of the light intensity of an image of an object being photographed, and these signals are stored in analog memories 32-1 to 32-K and thence fed to one input of the respective comparators 33-1 to 33-K.

Subsequently, central processor unit 15 supplies to D/A converter 34 successive digital signals to be used as reference information for comparison which signals gradually increase in magnitude. D/A converter 34 converts these digital signals into corresponding analog signals, which are then fed to the other input of comparators 33-1 to 33-K. In this manner, the photoelectric signals stored in analog memories 32-1 to 32-K are sequentially retrieved, whereby central processor unit 15 detects a minimum value and a maximum value among the photoelectric signals stored in these analog memories 32-1 to 32-K through an OR circuit and an AND circuit, both not shown. Central processor unit 15 uniquely relates the count in counter 38 and reference information output to D/A converter 34 in a manner such that when 6-bit counter 38 is reset to zero, reference information which corresponds to the minimum value is supplied to D/A converter 34 while reference information which corresponds to the maximum value is supplied to converter 34 when counter 38 exhibits a suitable positive value, for example, a maximum count of $2^6-1=63$. This completes the first retrieval step which represents a preprocessing prior to the conversion of the analog photoelectric signals into corresponding digital quantities.

The 6-bit counter 38 is then allowed to begin counting, starting from zero. Initially in the process of such counting, one of comparators 33-l (l being an integer from 1 to K) which is fed from one of analog memories 32-l storing a photoelectric signal of the minimum value reverses its output, and corresponding digital memories 35-l, 36-l stores the zero count in counter 38. As counter 38 continues to count, the magnitude of the digital signal which is supplied to D/A converter 34 as reference information increases in magnitude, so that the magnitude of the analog signal which is supplied to the other input of comparators 33-1 to 33-K as reference information also increases, whereby comparators 33-1 to 33-K sequentially reverse their outputs in the sequence of the increasing magnitude of the photoelectric signals stored in analog memories 32-1 to 32-K with which they are connected. The prevailing counts in counter 38 as such reversals occur are stored in corresponding digital memories 35-1 to 35-K, 36-1 to 36-K. In this manner, the photoelectric signals produced by the individual light acceptors elements $P_1$-$P_K$ of the first array 8 in accordance with an image of an object being photographed are converted into corresponding digital quantities and stored in digital memories 35-1 to 35-K, 36-1 to 36-K. When counter 38 reaches a count of $2^6-1=63$, the second retrieval step is completed.

Central processor unit 15 then drives address decoder 37 to read digital picture element information stored in digital memories 35-1 to 35-K, 36-1 to 36-K and store them in given areas within central processor unit 15.

Next, central processor unit 15 provides another instruction to selector circuit 31 in order to switch the active array from the first to the second array. Subsequent operation takes place in the same manner as described above for the first array 8. Thus, photoelectric signals produced by respective elements $Q_1$-$Q_K$ of the second array 9 in accordance with an image of an object being photographed are converted into corresponding digital signals and written into given areas in central processor unit 15.

Figure 14:
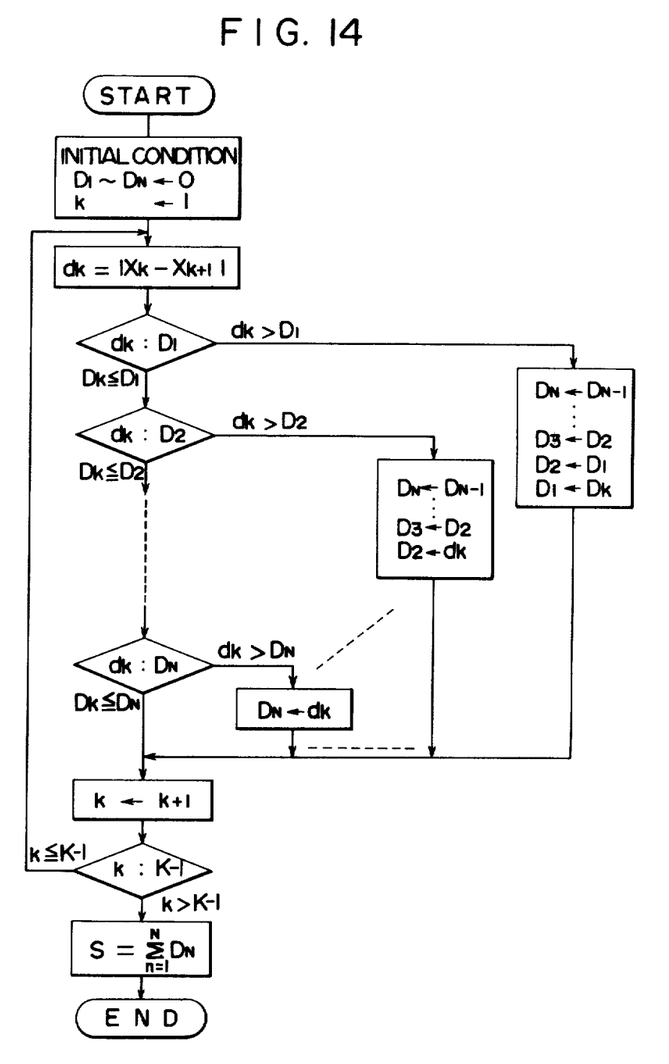
FIG. 14 is a flow chart indicating an arithmetic process which takes place in the central processor unit shown in FIG. 13.

After the photoelectric signals produced by the first and the second array 8, 9 are written into the given areas, central processor unit 15 effects an arithmetic operation to calculate the values of the evaluation functions $S_1$, $S_2$ of the respective arrays 8, 9 in accordance with a flow chart shown in FIG. 14. First of all, an initialization takes place resetting to zero areas $D_1$ to $D_N$ which are employed to save N greatest absolute magnitudes of differences between photoelectric signals, N being a positive integer not greater than $K-2$. It is to be understood that those N magnitudes are selected which are largest in their magnitude. Also, parameter k which specifies an index for absolute magnitude $d_k$ is set to 1. Subsequently, the absolute magnitude of a difference between photoelectric signals of adjacent light acceptor elements is calculated according to the formula $$d_k = |x_k - x_{k+1}|$$

where $x_k$ represents the value of a photoelectric signal from k-th element $P_k$ or $Q_k$. The absolute magnitude is sequentially compared against the content of save areas $D_1$ to $D_N$, and when the absolute magnitude $d_k$ is found to be greater than the content of a certain save area, it is saved therein while the content in the replaced area as well as the following areas containing smaller values are successively transferred to the next lower area, thus maintaining a sorted series of absolute magnitudes in save areas $D_1$ to $D_N$ in the sequence of their magnitude. This process is repeated $(K-1)$ times until the comparison for all of absolute magnitudes $d_1-d_{K-1}$ are completed. Then the process gets out of the loop by the determination $k:K-1$, and $$S = \sum_{n=1}^{N} D_n$$

is calculated which represents an evaluation function. When the processing represented by the flow chart is completed for the photoelectric signals from elements $P_1$ to $P_K$ of the array 8 to derive the evaluation function $S_1$, the same process is repeated for the photoelectric signals from elements $Q_1$-$Q_K$ of the array 9 to derive its associated evaluation function $S_2$. Subsequently, central processor unit 15 compares the values of both evaluation functions $S_1$ and $S_2$ to determine whether an in-focus position is reached. The output may be supplied to display 16 shown in FIG. 7 for purpose of display, and/or may be supplied as a control signal to drive control circuit 17 in order to move optical system 19 by means of optical system driver 18 until an in-focus position is reached.

Figure 15:
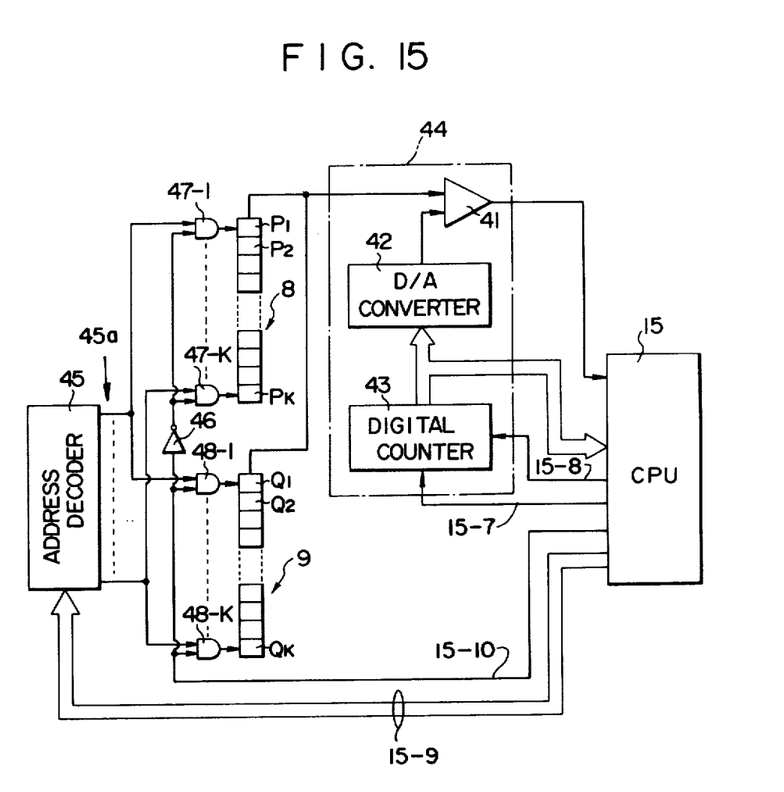
FIG. 15 is a simplified block diagram showing another form of signal processor which may be employed in the system of FIG. 7.

FIG. 15 shows another form of signal processing circuit 14 (see FIG. 7) of the focus detection system. In this arrangement, the photoelectric signals from individual elements $P_1$ to $P_K$, $Q_1$-$Q_K$ are sequentially read in contrast to the simultaneous reading employed in signal processing circuit 14 of FIG. 13. Specifically, in FIG. 13, photoelectric signals are stored in K analog memories 32-1 to 31-K and converted into corresponding digital signals by K converters 33-1 to 33-K, and thence fed to 2K digital memories 35-1 to 35-K, 36-1 to 36-K before they are transferred to central processor unit 15. It will be seen that this increases the size and the complexity of the circuit arrangement. By contrast, in the present arrangement, the photoelectric signals are sequentially read out and sequentially converted into corresponding digital signals by means of a single A/D converter for input to the central processor unit 15. As a result, the analog memories and digital memories which have been used in the previous arrangement as temporary storage are eliminated, and also a single converter is sufficient, thus greatly simplifying the circuit arrangement.

The arrangement comprises first and second arrays 8, 9 of light acceptor elements, A/D converter 44 which includes comparator 41, D/A conversion circuit 42 and digital counter 43, address decoder 45, inverter 46 which is used to select either one of the first and second arrays 8, 9, a gate array including 2K AND gates 47-1 to 47-K, 48-1 to 48-K which operate to select either one of the corresponding elements $P_1$ to $P_K$, $Q_1$ to $Q_K$ of the arrays 8, 9, and central processor unit 15.

The outputs of individual elements $P_1$ to $P_K$ and $Q_1$ to $Q_K$ of the arrays 8, 9 are connected in common to one input of comparator 41 in the A/D converter 44 while the other input of comparator 41 is connected with the output of D/A converter circuit 42. The output of comparator 41 is connected with central processor unit 15. D/A converter circuit 42 receives an output from digital counter 43, which is in turn connected with central processor unit 15. An incrementing line 15-7 and a clearing line 15-8 are connected from central processor unit 15 to digital counter 43.

Central processor unit 15 is also connected with address decoder 45 through a bus 15-9 which transmits an address control signal. Decoder 45 has a group 45a of K output lines, each of which is connected with one input of a corresponding one of AND circuits 47-1 to 47-K, 48-1 to 48-K which have their outputs connected with corresponding light acceptor elements in the arrays 8, 9. The other input of AND gates 48-1 to 48-K are fed in common with an array select signal which is supplied by central processor unit 15 through line 15-10, and the inverted array select signal which is produced by inverter 46 is applied in common to the other input of AND gates 47-1 to 47-K.

In operation, central processor unit 15 initially produces a low signal on the array select line 15-10, which is inverted by inverter 46 to provide a high signal for application to the one input of AND gates 47-1 to 47-K, thus enabling the first array 8 for operation. Subsequently, central processor unit 15 supplies an address control signal to address decoder 45, which then operates to apply a high signal to one input of AND gates 47-1 to 47-K in a sequential manner, thus enabling them. In this manner, the individual elements $P_1$-$P_K$ in the first array are sequentially enabled to supply their photoelectric signal to the one input of comparator 41. Each time a photoelectric signal from one light acceptor element $P_1$-$P_K$ is applied to comparator 41, digital counter 43 is incremented, and its count signal is converted into a corresponding analog signal by D/A converter circuit 42 before it is applied to the other input of comparator 41. In this manner, the photoelectric signal is sequentially compared against analog signals of a gradually increasing magnitude until comparator 41 reverses its output, whereupon a reversal signal is fed to central processor unit 15, with the prevailing count in counter 43 being saved in a storage area therein as a digital equivalent of the photoelectric signal. In this manner, the photoelectric signals from individual elements $P_1$ to $P_K$ of the first array are saved in selected storage areas within central processor unit 15.

After the photoelectric signals from the first array are saved in the central processor unit 15, the latter then produces a high signal on the array selection line, whereby the second array 9 is enabled for operation. The subsequent operation takes place in the same manner as described above when the array 8 is selected. Thus, the photoelectric signals from individual elements $Q_1$ to $Q_K$ of the second array 9 are saved in central processor unit 15 in digital form.

The subsequent calculation of the evaluation functions $S_1$ and $S_2$ by central processor unit 15 takes place in accordance with a flow chart as illustrated in FIG. 14 and in the same manner as mentioned previously.

It is to be understood that while embodiments of the invention have been described above in which the focus detection system of the invention is applied to a single lens reflex camera and to a camera having a between-lens shutter, it should be understood that the invention is equally applicable to other optical instruments such as microscopes, optical measuring units or the like.

Also it should be noted that the flow chart shown in FIG. 14 merely illustrates one example of an arithmethic operation for calculating the value of the evaluation function, and may be replaced by any programme which produces the same result. While the above description assumed that the process of the flow chart is implemented by a software in the central processor unit, it should be understood that suitable hardware may be provided externally of the central processor unit 15 to effect the same process. Additionally, it will be noted that when the elements in the array are divided into a plurality of sets, each of which is treated as a single effective element, in order to derive the evaluation function, a suitable preprocessing may be utilized to calculate the evaluation function in accordance with the described flow chart.

In the embodiment described above, a pair of arrays of light acceptor elements are provided. However, in an optical instrument where the value of an evaluation function at an in-focus position is previously known, a single array of such elements may be used to derive an evaluation function which is then compared against the known value to determine if the instrument is at its in-focus position.

What is claimed is:

1. A focus detection system comprising:
   (a) focussing means for focussing an image of an object,
   (b) light acceptor means including K photoelectric transducer elements juxtaposed with each other on a focus plane of the focussing means or on a plane which is optically conjugate with the focus plane, the light acceptor means producing photoelectric signals whose values vary in accordance with the distribution of light intensity of an image projected thereon by the focussing means,
   (c) calculating means for calculating the value of an evaluation function which indicates the sharpness of the image based on the signals from the photoelectric transducer elements,
   (d) the evaluation function being derived by initially obtaining the absolute magnitude of the difference between output signals from adjacent photoelectric transducer elements in the light acceptor means, and accumulating N of such absolute magnitudes which are greatest in their magnitude to provide an accumulated value (where $1 \leq N \leq K-2$), the accumulated value representing the value of the evaluation function.

2. A focus detection system comprising
   (a) focussing means for focussing an image of an object,
   (b) light acceptor means formed by a pair of arrays of K light acceptor elements, formed by photoelectric transducer elements (where K is an integer not less than 4) juxtaposed with each other, each array of the pair of arrays being respectively disposed at a given optical distance forwardly and rearwardly of a focus plane of the focussing means or a plane which is optically conjugate with the focus plane, the light acceptor means producing photoelectric signals in accordance with the distribution of light intensity of an image projected on the respective arrays of light acceptor elements by said focussing means,
   (c) calculating means for calculating the value of an evaluation function which indicates the sharpness of the image based on the signals from the photoelectric transducer elements,
   (d) selection means for successively selecting one or the other of the pair of arrays for connection with the calculating means, and
   (e) the evaluation function being formed by initially forming the absolute magnitude of the difference between output signals from adjacent photoelectric transducer elements in each array, and accumulating N of such absolute magnitudes which are greatest in their magnitude (where $1 \leq N \leq K-2$) to provide an accumulated value, the accumulated value representing the value of the evaluation function of the associated array, an in-focus position being detected as that position where the value of the evaluation function for one of the arrays is equal to the value of the evaluation function of the other array.

3. A focus detection system comprising
   (a) means for focussing an image of an object,
   (b) light acceptor means formed by a pair of arrays of K light acceptor elements, formed by photoelectric transducer elements (where K is an integer not less than 4), juxtaposed with each other, said arrays being respectively disposed at a given optical distance forwardly and rearwardly of a focus plane of the focussing means or a plane which is optically conjugate with the focus plane, the light acceptor means producing photoelectric signals having levels in accordance with the distribution of light intensity of the image projected onto the respective arrays by the focussing means,
   (c) calculating means for calculating the value of an evaluation function which indicates the sharpness of the image based on the output signals from the photoelectric transducer elements,
   (d) selection means for sequentially selecting one or the other of the pair of arrays in connection with the calculating means, and
   (e) the evaluation function being formed by dividing each array into a plurality of sets each containing m adjacent photoelectric transducer elements (where m is an integer more than one), each set being treated substantially as a single element by adding together the output signals of the transducer elements contained therein, obtaining the absolute magnitude of the difference between output signals of adjacent sets, and accumulating the M greatest absolute magnitudes (where $1 \leq M \leq K/m - 2$, M being an integer), the accumulated value representing the value of the evaluation function for the associated array, an in-focus position being detected as that position where the value of the evaluation function associated with one of the arrays is equal to the value of the evaluation function associated with the other array.

4. A focus detection system comprising
   (a) means for focussing an image of an object,
   (b) light acceptor means formed by a pair of arrays of K light acceptor elements, formed by photoelectric transducer elements (where K is an integer not less than 4), juxtaposed with each other, said arrays being respectively disposed at a given optical distance forwardly and rearwardly of a focus plane of the focussing means or a plane which is optically conjugate with the focus plane, the light acceptor means producing photoelectric signals having levels in accordance with the distribution of light intensity of the image projected on each array by the focussing means,
   (c) calculating means for calculating the value of an evaluation function which indicates the sharpness of the image based on the output signals from the photoelectric transducer elements, (d) selection means for sequentially selecting one or the other of the pair of arrays for connection with the calculating means, and (e) the evaluation function being formed by initially obtaining the absolute magnitude of the difference between output signals from adjacent photoelectric transducer elements in each array, and accumulating the N greatest absolute magnitudes (where $1 \leq N \leq K - 2$), the accumulated value representing the value of the evaluation function that is used for fine adjustment of the respective arays, (f) dividing each array into a plurality of sets each containing m adjacent photoelectric transducer elements (where m is an integer more than one), treating each set as a single element by adding together the output signals from the photoelectric transducer elements of each set to derive a sum signal which represents the output signal of the particular set, obtaining the absolute magnitude of a difference between output signals of adjacent sets, and accumulating the M greatest absolute magnitudes (where $1 \leq M \leq K/m - 2$, M being an integer), the accumulated value representing the value of an evaluation function associated with each array which is utilized for a coarse adjustment, (g) an in-focus position being determined by the comparison of the values of the coarse adjustment evaluation functions against each other whenever the value of the fine adjustment evaluation function is below a given threshold level and being determined by the comparison of the values of the fine adjustment evaluation functions with one another whenever such value is above said threshold level.

5. A focus detection system according to claim 1 in which the value of the evaluation function is formed by accumulating a number of the absolute magnitudes which does not exceed 20% of the total number of the absolute magnitudes.

6. A method for determining the sharpness of an image and employing means for focussing an image of an object and light acceptor means including K photoelectric transducer elements juxtaposed with each other on a focus plane of the focussing means or on a plane which is optically conjugate with the focus plane, the light acceptor means producing photoelectric signals whose values vary in accordance with the distribution of light intensity of an image projected thereon by the focussing means, said method comprising the steps of:

(a) determining the absolute magnitude of the difference between photoelectric signals from adjacent photoelectric transducer elements in the light acceptor means;

(b) accumulating N of such absolute magnitudes having the greatest magnitude to obtain an accumulated value (where $1 \leq N \leq K - 2$), said accumulated value representing the value of a first evaluation function; and (c) comparing the first evaluation function against a second predetermined evaluation function, whereby the difference therebetween represents an out-of-focus condition and the polarity of the difference represents the direction the focussing means should be moved to bring the image into focus.

7. A focus detection system comprising a method for determining the sharpness of an image and employing focussing means for focussing an image of an object, light acceptor means formed by a pair of arrays of K light acceptor elements, formed by photoelectric transducer elements (where K is an integer not less than 4) juxtaposed with each other, each array of the pair of arrays being respectively disposed at a given optical distance forwardly and rearwardly of a focus plane of the focussing means or a plane which is optically conjugate with the focus plane, the light acceptor means producing photoelectric signals in accordance with the distribution of light intensity of an image projected on the respective arrays of light acceptor elements by said focussing means, said method comprising the steps of:

(a) determining the absolute magnitude of the difference between photoelectric signals from adjacent photoelectric transducer elements in each array;

(b) accumulating N of such absolute magnitudes which have the greatest magnitude (where $1 \leq N \leq K - 2$) to provide an accumulated value, said accumulated value representing the value of an evaluation function of the associated array for the purpose of making a fine adjustment of the focussing means; and (c) comparing the values of the evaluation functions for said arrays whereby the magnitude of the difference between said evaluation function values represents the degree said image is out-of-focus and the polarity of the difference represents the direction said focussing means should be moved to bring the image into focus.

8. A focus detection system comprising a method for determining the sharpness of an image and employing focussing means for focussing an image of an object, and light acceptor means formed by a pair of arrays of K light acceptor elements, formed by photoelectric transducer elements (where K is an integer not less than 4) juxtaposed with each other, each array of the pair of arrays being respectively disposed at a given optical distance forwardly and rearwardly of a focus plane of the focussing means or a plane which is optically conjugate with the focus plane, the light acceptor means producing photoelectric signals in accordance with the distribution of light intensity of an image projected on the respective arrays of light acceptor elements by said focussing means, the transducer elements of said arrays being arranged in sets, each set containing m adjacent transducer elements (where m is an integer greater than one), said method comprising the steps of:

(a) summing the output signals of the transducer elements in each set;

(b) obtaining the absolute magnitude of the difference between summed output signals of adjacent sets;

(c) accumulating the M greatest absolute magnitudes where $1 \leq M \leq K/m - 2$, M being an integer), the accumulated value representing the value of the evaluation function for the associated array; and (d) comparing the evaluation functions of the arrays, the difference between said functions representing the magnitude of the out-of-focus condition and the polarity of the difference determining the direction of movement of the focussing means to bring the image into focus.

9. The method of claim 8 further comprising the steps of:

(a) obtaining the absolute magnitude of the difference between transducer element output signals of adjacent photoelectric transducer elements in each array, and accumulating the N greatest absolute magnitudes (where $1 \leq N \leq K-2$), the accumulated value representing the value of the evaluation function that is used for fine adjustment of the respective arrays.

10. The method of claim 7 further comprising the steps of:

(a) designating in each array m adjacent transducer elements as a set (where m is an integer greater than one), there being a plurality of sets in each array; summing the output signals of the photoelectric transducer elements of each set to derive a sum signal which represents the sum output signal sum of the particular set; obtaining the absolute magnitude of the difference between the summed output signals of adjacent sets; and accumulating the M largest absolute magnitudes (where $1 \leq M \leq K/m-2$, M being an integer), the accumulated value representing the value of an evaluation function associated with each array which is utilized for a coarse adjustment;

(b) comparing the values of the coarse adjustment evaluation functions of each array against each other whenever the value of the fine adjustment evaluation functions are below a given threshold level and comparing the values of the fine adjustment evaluation function against each other whenever at least one of the fine adjustment evaluation functions is above said given threshold level.

11. The method of claim 7 wherein step (a) further comprises accumulating a number of the absolute magnitudes which does not exceed 20% of the total number of the absolute magnitudes.

12. The method of claim 6 further comprising the step of moving the focussing means in a direction determined by the polarity of the difference between said evaluation functions and adjusting the focussing means an amount equal to the magnitude of the difference between said evaluation functions.

* * * * *